United States Patent [19]

Sakai et al.

[11] Patent Number: 4,496,832

[45] Date of Patent: Jan. 29, 1985

[54] FOCUSING STATE DISCRIMINATING SYSTEM

[75] Inventors: Shinji Sakai; Nobuhiko Shinoda; Takao Kinoshita, all of Tokyo; Kazuya Hosoe, Kunitachi; Takashi Kawabata, Kamakura, all of Japan

[73] Assignee: Canon Kabushiki Kaisha, Tokyo, Japan

[21] Appl. No.: 310,373

[22] Filed: Oct. 9, 1981

[30] Foreign Application Priority Data

Oct. 16, 1980 [JP] Japan ................ 55/144782

[51] Int. Cl.³ .............................. G01J 1/20
[52] U.S. Cl. .................. 250/201; 354/406; 354/409; 250/204
[58] Field of Search ............ 250/201, 201 PF, 204; 354/402, 406, 409

[56] References Cited

U.S. PATENT DOCUMENTS 3,532,045 10/1970 Berg .
4,277,156 7/1981 Fukushima et al. .............. 354/25
4,341,953 7/1982 Sakai et al. .............. 250/201 PF

FOREIGN PATENT DOCUMENTS 147336 12/1976 Japan .
 79425  7/1978 Japan .
106421  8/1980 Japan .

*Primary Examiner*—F. L. Evans
*Attorney, Agent, or Firm*—Fotzpatrick, Cella, Harper & Scinto

[57] ABSTRACT

A focusing state discriminating system of the invention discriminates the focusing state of an image forming optical system, based on signals F1, F2 and F3 representing image formation states of images formed at first, second and third positions of the optical system which substantially correspond to positions slightly in front of, coincident with and slightly behind the predetermined focal plane of the image forming optical system. The operation for discrimination in this system includes at least a comparison of $|F1-F3|$ and $K(F1+F2+F3)$, where K is a constant.

6 Claims, 4 Drawing Figures

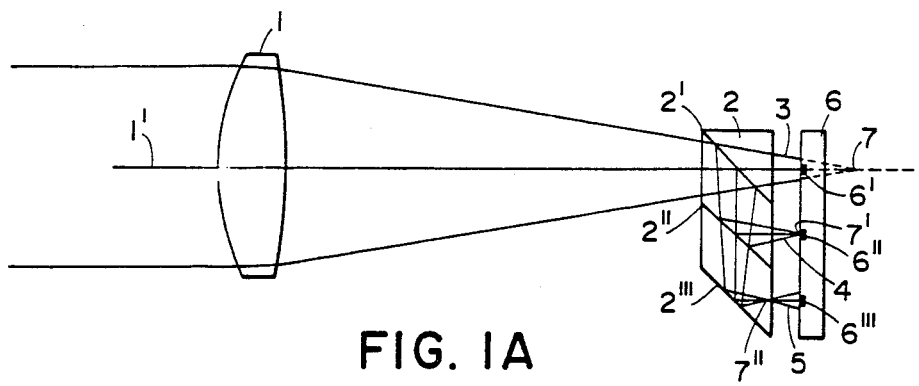
FIG. IA
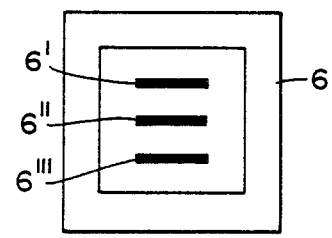
FIG. IB
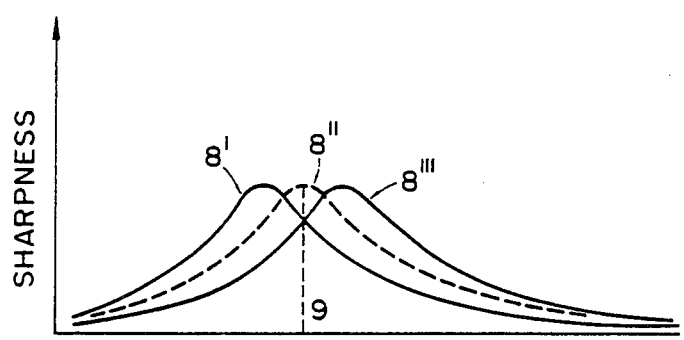
FIG. IC

FOCUSING STATE DISCRIMINATING SYSTEM

BACKGROUND OF THE INVENTION

1. Field of the Invention

The present invention relates to a focusing state discriminating system and, more particularly, to a focusing state discriminating system which discriminates the focusing state of an image forming optical system, based on signals representing image formation states of images formed at first, second and third positions of the optical system which substantially correspond to positions slightly in front of, coincident with and slightly behind a predetermined focal plane of the image forming optical system.

2. Description of the Prior Art

Various systems have been proposed for discriminating the focusing state of an image forming optical system, based on signals representing image formation states of images formed at first, second and third positions of the optical system which substantially correspond to positions slightly in front of, coincident with and slightly behind a predetermined focal plane of the image forming optical system. Examples of such systems are disclosed in U.S. Pat. No. 3,532,045 (corresponding German DOLS No. 1,547,457); U.S. Pat. No. 4,227,156 (corresponding to German DOLS No. 2,923,573); and Japanese Laid-Open Patent Applications No. 147336/1976, No. 53-79,425, and No. 106421/1980.

Examining the methods of these five prior art examples for discriminating the focusing states, in the system of the first example, U.S. Pat. No. 3,532,045, the conditions for discriminating the in-focus state are:

$f2 > f1$
$f2 > f3$
$f2 - f1 = f2 - f3$ where f1, f2 and f3 are signals representing contrasts of images at the first, second and third positions, respectively, as described above.

In the system in the second, U.S. Pat. No. 4,277,156, the in-focus state is detected by the peak of P2 in the range satisfying $P2 > P1$ and $P2 > P3$, where P1, P2 and P3 are output signals from photoelectric elements corresponding to the first, second and third positions as described above.

In the systems disclosed in the third and fourth, Japanese Patent Applications No. 147336/1976 and No. 53-79,425, the conditions for discriminating the in-focus state are:

$f'2 > f'1$
$f'2 > f'3$ where f'1, f'2 and f'3 represent the sharpness of the images at the first, second and third positions as described above.

Finally, in the fifth, Japanese Patent Application No. 106421/1980, the conditions for discriminating the in-focus state are:

$P2 > P1$
$P2 > P3$
$P1 = P3$ where P1, P2 and P3 are defined as in U.S. Pat. No. 4,277,156.

In the first, second and fifth examples, the in-focus state is understood not as a range of finite value but as a single point. However, this is not very practical and may result in inconvenience when it is considered in terms of optical equipment such as general cameras. It is to be noted that the first and fifth examples build upon the same principle.

To the contrary, in the third and fourth examples, the in-focus state is discriminated within a relatively wider range than a single point. This, however, also results in other inconveniences such as focusing precision.

In order to eliminate the problems as described above, a system which sets a range for the in-focus state which is neither too wide nor too narrow is proposed in U.S. patent application Ser. No. 151,533, "Focus Detecting System", Sakai et al, filed on May 19, 1980 (corresponding German Patent Application No. P 30 19 901.0) by the assignee of the present application. The embodiment of this invention shows a system which defines the conditions for the in-focus state as:

$f'2 > f'1$
$f'2 > f'3$
$|f'1 - f'2| <$ or $\leq \alpha f'2$ (where $\alpha$ is a constant).

According to this system, the range for discriminating the in-focus state is defined by $\alpha f'2$, that is, a function of a signal f' representing the image formation state of the image. The range for discriminating the in-focus state is less subject to adverse affects of fluctuations in brightness of the image or changes in contrast, resulting in an advantage of more precise and stable discrimination.

SUMMARY OF THE INVENTION

It is an object of the present invention to provide an improvement over the algorithm for discrimination as disclosed in the U.S. patent application Ser. No. 151,533 (corresponding German Patent Application No. P 30 19 901.0) of the assignee of the present invention.

More specifically, it is an object of the present invention to provide a focusing state discriminating system which discriminates the focusing state of an image forming optical system, based on signals representing image formation states of images formed at first, second and third positions of the optical system which substantially correspond to positions slightly in front of coincident with, and slightly behind a predetermined focal plane of the image forming optical system; which is capable of performing correct and stable discrimination regardless of fluctuations in the brightness of the image or changes in the contrast; and which is capable of performing more precise and stable discriminations over a wider range involving the near-focus and far-focus states across the in-focus state.

In accordance with the present invention, the objects as described above are achieved by including in the operation for discrimination at least a comparison of $|F1 - F3|$ and $K(F1 + F2 + F3)$ where K is a constant and F1, F2 and F3 are signals representing the image formation states of images at the first, second and third positions described above.

It is another object of the present invention to provide an algorithm which defines the discriminating conditions in more detail to thereby reduce erratic discriminations to the minimum and allow more practical discriminations. For example, when the image is extremely out-of-focus (that is, when the focal point of the optical system is extremely deviated), only slight differences are maintained among the image formation states of the images at the three positions, so that discrimination may be hard to perform. The object of the present invention, therefore, is to provide an algorithm which defines discrimination conditions in detail as a countermeasure to such problems and which thus allows practical discrimination.

In order to achieve the above object, there is provided according to an aspect of the present invention a focusing state discriminating system which (a) discriminates an in-focus state when conditions $|F1-F3|<$(or $\leq$) $K1(F1+F2+F3)$, $F2>$(or $\geq$) $K2$, $F2>F1$, and $F2>F3$ are satisfied (where K1 is a given constant);

(b) discriminates a near-focus state wherein the imaging plane is in front of the predetermined focal plane (that is, the focal point is in front of an object to the photographed), when the conditions in item (a) are not satisfied and conditions $F1-F3>$(or $\geq$) $K3$ and $F1+F3>$(or $\geq$) $K4$ are satisfied; and (c) discriminates a far-focus state wherein the imaging plane is located behind the predetermined focal plane (that is, the focal point is behind the object), when the conditions in item (a) are not satisfied and the conditions $F3-F1>$(or $\geq$) $K3$ and $F1+F3>$(or $\geq$) $K4$ are satisfied.

The above and other objects of the present invention will become apparent from the following detailed description of the preferred embodiment of the present invention when taken in conjunction with the accompanying drawings.

BRIEF DESCRIPTION OF THE DRAWINGS

The preferred embodiment of the present invention will now be described with reference to the accompanying drawings, in which:

FIGS. 1A to 1C schematically show the principle of focus detection of a focus detecting system using a focusing state discriminating system according to the present invention, wherein FIG. 1A shows an example of the optical arrangement of the focus detecting system, FIG. 1B is a front view of an image sensor shown in FIG. 1A, and FIG. 1C is a graph showing the change in the sharpness of the images at the three photosensitive surfaces shown in FIG. 1A.

DESCRIPTION OF THE PREFERRED EMBODIMENT

Figure 2:
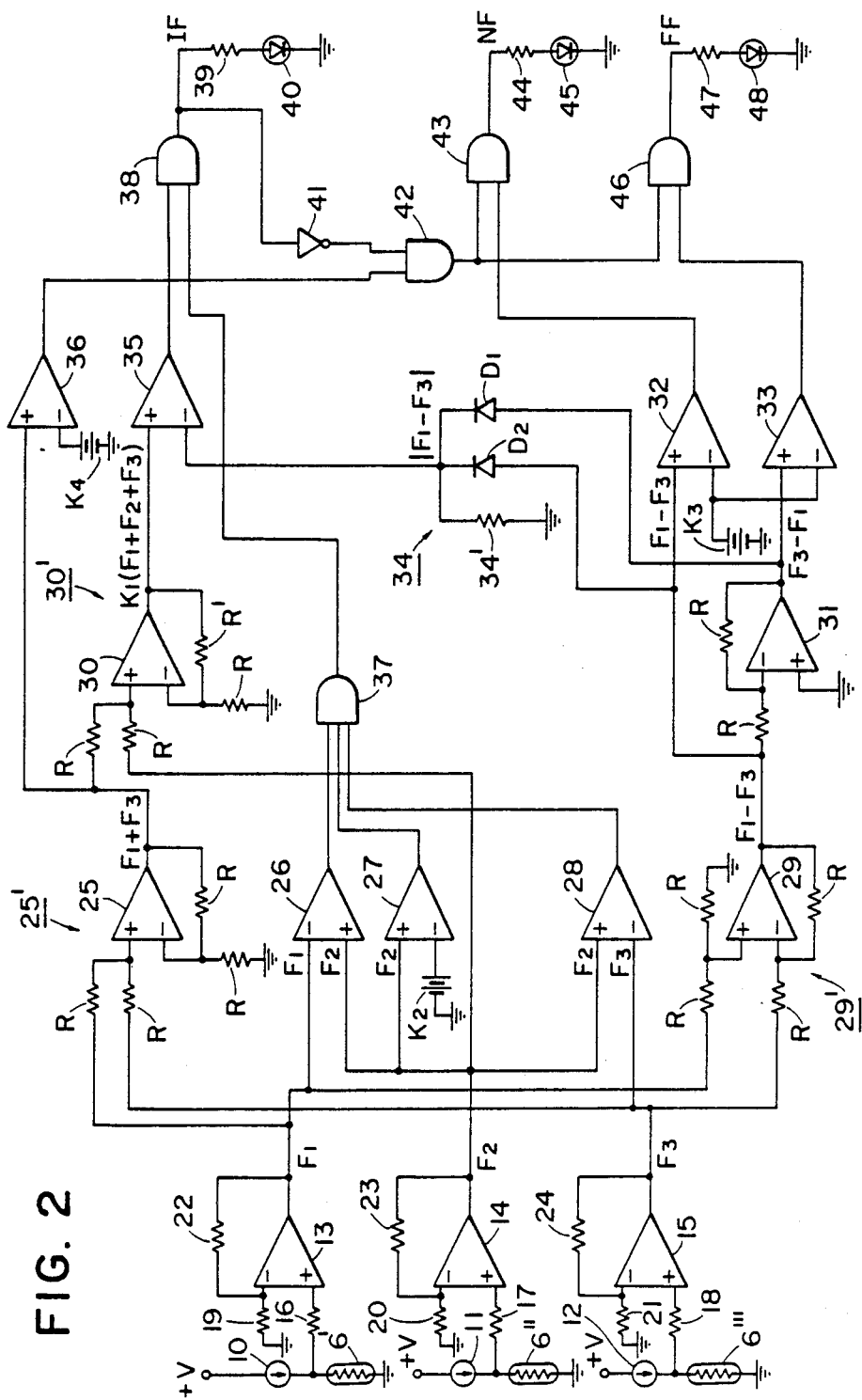
FIG. 2 is a circuit diagram showing the configuration of electric circuitry of a focus detecting system adopting a focusing state discriminating system according to one embodiment of the present invention.

Referring to FIG. 1A, an imaging lens 1 has an optical axis 1'. A beam splitter 2 is arranged in the optical path of the imaging lens 1 and has semi-transmittal sections 2' and 2" and a total reflection section 2'". Light emerging from the imaging lens 1 becomes incident on the semi-transmittal section 2', and is then divided by the semi-transmittal section 2" and the total reflection section 2'" into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy of the three divided light rays 3, 4 and 5 becomes substantially the same. A photoelectric transducer 6 has three light-receiving sections 6', 6" and 6'".

If the convergent point of the light ray 3 is at point 7, it is easily seen that the convergent points of the divided light rays 4 and 5 are at points 7' and 7", respectively. If the convergent point 7 of the light ray 4 which is reflected and divided by the semi-transmittal sections 2' and 2" coincides with the light-receiving section 6'", the convergent point 7 of the light ray 3 incident on the light-receiving section 6' is located behind the light-receiving section 6', and the convergent point 7" of the light ray 5 incident on the light-receiving section 6'" is located in front of the light-receiving section 6'". The deviations of these converging points from the light-receiving sections become the same if the distances between the semi-transmittal sections 2' and 2" and between 2" and the total reflection section 2'" are equal to each other. As a result, the sharpness of the image on the light-receiving section 61" becomes maximum, and the sharpnesses of the images of the light-receiving sections 6' and 6'" become low but are similar to each other.

If the imaging lens 1 is displaced along the optical axis 1', the sharpnesses of the images on the light-receiving sections 6', 6" and 6'" change as shown in FIG. 1C. Curves 8', 8" and 8'" representing changes in the sharpnesses of the images on the light-receiving sections 6', 6" and 6'" from peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6'" are represented by the point 9 in FIG. 1C. Then, it is apparent from FIG. 1C that the relationships between the sharpnesses 8' and 8'" are inverted according to whether the imaging plane surface of the lens 1 is in front or behind the light-receiving section 6". In this manner, the near-focus state and the far-focus state can be detected.

FIG. 1B is a front view of the photoelectric transducer 6. In the embodiment shown in FIG. 1B, the respective light-receiving sections 6', 6" and 6'" comprise narrow belt-shaped CdS elements but are not limited thereto. Therefore, the photoelectric transducer which are suitable for the purpose of the present invention are not limited to CdS devices but may be extended to photovoltaic elements of SPC, CCD or other types.

A focus detecting system using the beam splitter 2 and the photoelectric transducer 6 having the three light-receiving sections 6', 6" and 6""is thus provided. A description will now be made of a focusing state discriminating system which discriminates the focusing state of the imaging lens 1 based on the image formation states (sharpness of the image) of the images on the light-receiving sections 6', 6" and 6'", with reference to FIG. 2.

Referring to FIG. 2, the light-receiving elements 6', 6" and 6'" such as CdS are connected to constant current sources 10, 11 and 12, respectively, to be supplied with constant currents. As is well known, the light-receiving elements 6', 6" and 6'" have resistances which correspond to the image formation state, for example, the sharpness of the image on their light-receiving surfaces. These resistances are converted to voltages. The resistances of the light-receiving elements 6', 6" and 6'" are converted into the voltages and are input to amplifiers 13, 14 and 15, respectively, which have input resistors 16 and 19, 17 and 20, and 18 and 21, and feedback resistors 22, 23 and 24, respectively. Signals F1, F2 and F3 output from the amplifiers 13, 14 and 15 represent the sharpnesses of the images on the light-receiving elements 6, 6" and 6'".

The method for obtaining the signals F1, F2 and F3 is not limited to the method as described above. For example, these signals may be obtained by obtaining image signals from solid image pickup elements such as CCD elements as the photoelectric transducer, and processing these image signals as disclosed in U.S. patent application Ser. No. 59,635, "Focus Detecting System", Kinoshita et al., filed on July 23, 1979 (corresponding German DOLS No. 29 30 636), U.S. patent application Ser. No. 151,703, "Image Sharpness Detecting System", Kawabata et al., filed on May 20, 1980 (corresponding German Patent Application No. P 30 19 908.7), or U.S. patent application Ser. No. 151,533 (corresponding German DOLS No. P 30 19 901.0), all assigned to the assignee of the present invention.

The signals F1 and F3 are supplied to an adder 25' which consists of an input resistor R and an amplifier 25 and which outputs a signal of F1+F3. The output of a comparator 26 goes to high level when F2>F1. The output of a comparator 27 goes to high level when F2>(or $\geq$) K2, where K2 is a constant. The output of a comparator 28 goes to high level when F2>F3. The output of an AND gate 37 goes to high level only when all the outputs from the comparators 26, 27 and 28 are at high level. A subtracting circuit 29' consists of another input resistor R and a differential amplifier 29 and outputs F1−F3. The gain of an adder 30' is so set that the adder 30' receives as the inputs for addition F1+F3 and F2 and outputs K1 (F1+F2+F3), where K1 is a constant. The adder 30' consists of an amplifier 30, an input resistor R and a feedback resistor R' which is equal in resistance to R(2K1−1). An inverting amplifier 31 inverts the sign of an input; it receives F1−F3 as an input and outputs F3−F1. Comparators 32 and 33 constitute a window comparator and are supplied with a reference voltage corresponding to K3, where K3 is a constant. The output of the comparator 32 goes to high level when F1−F3>(or $\geq$) K3. The output of the comparator 33 does to high level when F1−F3<(or $\leq$) K3. The signals F1−F3 and F3−F1 are converted to an absolute value signal |F1−F3| through an absolute value converting circuit 34, which is supplied to the negative input end of a comparator 35. The output of a comparator 36 goes to high level when F1+F3>(or $\geq$) K4, where K4 is a constant.

With the circuit configuration as described above, when the output of the comparator 35 goes to high level when K1(F1+F2+F3)>(or $\geq$) |F1−F3|, and the output of the AND gate 37 goes to high level when F2>F1, F2>(or $\geq$) K2, and F2>F3, the output of an AND gate 38 goes to high level to generate a signal IF representing the in-focus state. The signal IF is supplied to an LED 40 through a resistor 39 to energize it, indicating that the optical system in the in-focus state.

On the other hand, when the output of the comparator 36 goes to high level when F1+F3$\geq$(or $\geq$) K4 and the output of the AND gate 38 goes to low level, that is, when the output of an inverter 41 is at high level in the out of focus state, the output of an AND gate 42 goes to high level. When the output of the comparator 32 is at high level if F1−F3>(or $\geq$) K3, the output of an AND gate 43 goes to high level to generate a signal NF representing the near-focus state. The signal NF is supplied to an LED 45 through a resistor 44 to light it up. This indicates the near-focus state wherein the lens 1 focuses on an imaging plane in front of the predetermined focal plane, that is, the focal point of the lens 1 is in front of the object. On the other hand, when the output of the comparator 33 is at high level when F3−F1>(or $\geq$) K3, the output of an AND gate 46 goes to high level to generate a signal FF representing the far-focus state. The signal FF is supplied to an LED 48 through a resistor 47 to light it up. This indicates the far-focus state wherein the lens focuses on an imaging plane behind the predetermined focal plane, that is, when the focal point of the lens 1 is behind the object.

The signals IF (representing the in-focus state), NF (representing the near-focus state), and FF (representing the far-focus state) are generated according to the combinations of the values of signals F1, F2 and F3 and the constant Ki (i=1, 2, 3 and 4). The discrimination conditions may thus be summarized as follows:

(a) The system discriminates an in-focus state when the conditions |F1−F3|>(or $\leq$) K1(F1+F2+F3), F2>(or $\geq$) K2, F2>F1, and F2>F3 are satisfied.

(b) The system a near-focus state when the conditions F1−F3>(or $\geq$) K3 and F1+F3>(or $\geq$) K4 are satisfied, and the conditions in item (a) are not satisfied.

(c) The system discriminates a far-focus state when the conditions F3−F1>(or $\geq$) K3, F1+F3>(or $\geq$) K4 and F3>F1 are satisfied, and the conditions in item (a) are not satisfied.

If the LEDs 40, 45 and 48 which go on and off according to the discrimination conditions as described above are arranged within a range finder, for example, in the case of a camera, the focusing state of the lens may be clearly indicated to the operator. It is, of course, possible to perform automatic focusing of the imaging lens using the signals IF, FF and NF (the outputs of the AND gates 38, 43 and 46).

As may be seen from the above description, the present invention provides a focusing state discriminating system which discriminates the focusing state of an image forming optical system, based on signals F1, F2 and F3 representing image formation states of images at first, second and third positions formed by the optical system substantially correspond to positions slightly in front of, coincident with and slightly behind the predetermined focal plane of the image forming optical system, characterized in that the operation for discrimination includes at least a comparison of |F1−F3| and K(F1+F2+F3), where K is a constant. The advantages of the system according to the present invention may be summarized as follows. In the system of the embodiment disclosed in U.S. patent application Ser. No. 151,533 (corresponding German Patent Application No. P 30 19 901.0), a comparing step of |F1−F3| and K'F2 (where K' is a constant) similar to that incorporated in the system of the present invention is included in the operation for discrimination. Although this system is capable of performing discrimination on the focusing state with precision and stability, the range for allowing correct discrimination of the near-focus state and the far-focus state at both sides of the in-focus state may be relatively narrow depending upon the value of K'F2. An improvement with respect to this problem is provided according to the present invention by using K(F1+F2+F3) as the comparison reference in place of K'F2. Accordingly, the system according to the present invention is capable of performing discrimination of the near-focus and far-focus over a wider range and with precision and stability.

The discrimination conditions as described above with reference to the embodiment of the present invention provide an algorithm which is extremely useful in accomplishing practical discrimination without causing erratic discriminating operations.

What we claim is:

1. A system for discriminating a focusing state of imaging lens means with respect to an object, comprising:
   (A) means for generating signals F1, F2 and F3 associated with image formation states of images of the object formed by said imaging lens means at first, second and third positions substantially corresponding to positions slightly in front of, coincident with and behind a predetermined focal plane of said imaging lens means; and
   (B) means for discriminating the focusing states of said images formed by said imaging lens means, based on the signals generated from said signal generating means, said discriminating means performs, as an operation for discrimination, at least a comparison of |F1−F3| and K1(F1+F2+F3), where K1 is a constant.

2. A system according to claim 1, wherein said discriminating means further performs, as an operation for discrimination, comparisons of F2 with F1 and with F3.

3. A system according to claim 2, wherein said discriminating means further performs, as an operation for discrimination, a comparison of F2 with K2, where K2 is a constant.

4. A system according to claim 1, 2 or 3, wherein said discriminating means further performs, as an operation for discrimination of a near-focus state and a far-focus state, a comparison of F1+F3 with K4, where K4 is a constant.

5. A system according to claim 4, wherein said discriminating means further performs, as an operation for discrimination for a near-focus state, a comparison of F1−F3 with K3 and, as an operation for discrimination for a far-focus state, a comparison of F3−F1 with K3, where K3 is a constant.

6. A system according to claim 1, wherein said discriminating means further performs, as an operation for discrimination of a near-focus state, a comparison of F1−F3 with K3 and, as an operation for discrimination of a far-focus state, a comparison of F3−F1 with K3, where K3 is a constant.

* * * * *